United States Patent [19]
Kim

[11] Patent Number: 6,166,874
[45] Date of Patent: Dec. 26, 2000

[54] METHOD OF CONTROLLING FLYING OF MAGNETIC HEAD AND DEVICE THEREFOR IN HARD DISK DRIVE

[75] Inventor: Tae-ho Kim, Suwon, Rep. of Korea

[73] Assignee: Samsung Electronics Co., Ltd., Kyungki-do, Rep. of Korea

[21] Appl. No.: 09/072,454

[22] Filed: May 5, 1998

[30] Foreign Application Priority Data

Jul. 31, 1997 [KR] Rep. of Korea .................. 97-36559

[51] Int. Cl.[7] .................................................. G11B 5/54
[52] U.S. Cl. .............................................. 360/75; 360/60
[58] Field of Search .................................. 360/75, 60, 69, 360/97.02, 97.03

[56] References Cited

U.S. PATENT DOCUMENTS

| | | | |
|---|---|---|---|
| 4,040,103 | 8/1977 | White | 360/75 |
| 4,996,878 | 3/1991 | Kubler | 73/510 |
| 5,227,929 | 7/1993 | Comerford | 360/75 |
| 5,856,895 | 11/1999 | Schaenzer et al. | 360/103 |
| 5,986,845 | 11/1999 | Yamaguchi et al. | 360/75 |

FOREIGN PATENT DOCUMENTS

| | | | |
|---|---|---|---|
| 0 560 600 | 9/1993 | European Pat. Off. . | |
| 0 655 736 | 5/1995 | European Pat. Off. . | |
| 0 658 894 | 6/1995 | European Pat. Off. . | |
| 2-226560 | 9/1990 | Japan . | |
| 63-282973 | 9/1990 | Japan | 360/75 H |
| 3-214479 | 9/1991 | Japan | 360/75 H |
| 4-271072 | 9/1992 | Japan . | |
| 6-111545 | 4/1994 | Japan . | |
| 6-96545 | 4/1994 | Japan | 360/75 H |
| 7-262726 | 10/1995 | Japan . | |

WO 94/22135 9/1994 WIPO .

OTHER PUBLICATIONS

Patent Abstracts of Japan, vol. 017, No. 062, (P–1483) Feb. 8, 1993, & JP 04 271072 A (NEC Corp) Sep. 28, 1992 *Abstract.
Patent Abstracts of Japan, vol. 016, No. 003, (P–1294) Jan. 7, 1992 & JP 03 225686 A (NEC Corp), Oct. 4, 1991 *Abstract.
Patent Abstracts of Japan, vol. 097, No. 006, Jun. 30, 1997, & JP 09 035285 A (Matsushita Electric Ind Co Ltd) Feb. 7, 1997 *Abstract.
Patent Abstracts of Japan, vol. 006, No. 192 (P–145), Sep. 30, 1982 & JP 57 103159 A (Fujitsu Ltd), Jun. 26, 1992 *Abstracts.

*Primary Examiner*—Hoa T. Nguyen
*Assistant Examiner*—James L Habermehl
*Attorney, Agent, or Firm*—Sughrue, Mion, Zinn, Macpeak & Seas, PLLC

[57] ABSTRACT

A magnetic head flying controlling device in a hard disk drive including a swing arm which is pivoted by a voice coil motor, a suspension combined with the swing arm for supporting a magnetic head, a first sensor installed on the body of the suspension, for detecting a vertical displacement of the suspension as a signal, a second sensor installed on the body of the suspension, for detecting a horizontal displacement of the suspension as a signal, a control circuit portion for halting the recording or reproduction of the magnetic head based on signals output from the first and second sensors while at the same time storing the halted position of the magnetic head, and generating a control signal for controlling the operation of the magnetic head, and a magnetic head flying actuator for controlling the driving of the magnetic head based on the control signal.

11 Claims, 7 Drawing Sheets

METHOD OF CONTROLLING FLYING OF MAGNETIC HEAD AND DEVICE THEREFOR IN HARD DISK DRIVE

BACKGROUND OF THE INVENTION

1. Field of the Invention

The present invention relates to a hard disk drive which is used as an auxiliary memory device of a computer, and more particularly, to a control method for controlling the floating displacement of a flying magnetic head with respect to a disk, and a device therefor.

2. Description of Related Art

A hard disk drive in which information is recorded or reproduced is usually used as an auxiliary memory device of a personal computer. Recently, the storage capacity of the hard disk drive has increased significantly, whereas the size thereof has gradually been reduced. Accordingly, the track pitch of a disk and the bit cell thereof become finer and finer. Thus, a servo control technology for floating a magnetic head at a constant and fine interval throughout the disk region is required to record or reproduce information on such a disk.

FIG. 1 shows a conventional hard disk drive Referring to FIG. 1, at least one magnetic disk 11 is rotatably mounted on a spindle motor (not shown) installed on a base frame 10. Also, a magnetic head actuator 20 for pivoting around a pivot shaft to fly a magnetic head (h) on the disk 11 is included.

The magnetic head actuator 20, as shown in FIG. 2, includes a swing arm 23 which is pivoted around a shaft 22 by a voice coil motor 21, a suspension 24 installed on the swing arm 23, and a magnetic head (h) fixed on a gimbal 25 installed at the end of the suspension 24. Reference numeral 30 is a circuit driving portion which controls the transmission of a signal between a main circuit board, interfaced with a main body such as a computer, and the magnetic head (h), and also controls the driving of the actuator 20.

In the operation of the hard disk drive, the magnetic head (h) detects information from tracks on the disk 11 while moving in a radial direction of the disk 11 according to the driving of the actuator 20. The magnetic head (h) is in contact with the disk 11 at the beginning of the operation of the disk driver, and then rises to a certain height from the disk 11 as the rotating speed of the disk 11 gradually increases. That is, since the magnetic head (h) contacts the disk 11 at the initial operation of the disk driver, abrasion of the magnetic head occurs. Also, the magnetic head may be damaged by an impact generated when the magnetic head (h) lands on the surface of the disk 11 after the operation of the disk driver.

In order to solve the above problem, the conventional hard disk drive includes a vibration detecting sensor 40 for detecting and controlling the flying displacement of the magnetic head (h), as shown in FIG. 1.

The vibration detecting sensor 40 includes two thin piezoelectric elements 41 and 42 which are joined to each other and capable of having opposite polarities, as shown in FIG. 3. The vibration detecting sensor 40 is installed on the base frame 10 such that one end is fixed and the other end is free. For example, when an impact or vibration is transmitted from an external source, the free end is displaced to thus warp the piezo-electric elements 41 and 42 as shown in FIG. 3, thereby generating an electric charge. A voltage signal generated according to the above is transmitted to the magnetic head actuator 20, so that information recording or reproduction by the magnetic head (h) is temporarily halted. Therefore, after the cause of the vibration is removed, the recording or reproduction can be resumed from the halted state.

However, the degree of displacement of the flying magnetic head detected by the vibration detecting sensor 40 varies depending on the position where the sensor is installed and the source of the external vibration. Furthermore, since the base frame 10 is made of a rigid material which can absorb vibration, the sensor 40 cannot detect minor impacts or vibrations. In particular, in the case of a high density disk whose track pitch is very fine, the reliability of the detection is further deteriorated, and it is difficult to achieve an active control algorithm which can correct the generation of the displacement in real time.

FIGS. 4 and 5 show a conventional magnetic head actuator for actively controlling the flying displacement of a magnetic head due to an external impact or vibration. Like reference numerals as those in the above-mentioned drawings denote the same components. Referring to FIGS. 4 and 5, a piezo-electric polymer element 26 which acts as a sensor for detecting a displacement due to an impact or vibration, is attached to one surface of the suspension 24. A piezo-electric ceramic element 27, which is a correction actuator for receiving a signal indicating the amount of displacement detected by the piezo-electric polymer element 26 and correcting the suspension 24 to a normal position, is attached to the opposite surface of the suspension 24. In FIG. 5, reference numeral 50 is a control circuit driving portion for connecting the piezo-electric polymer 26 to the ceramic element 27.

The piezo-electric polymer element 26 detects the displacement of the suspension 24 involved with displacement of the magnetic head h, to detect the displacement of the magnetic head h. Information on the detected amount of displacement is transmitted to the control circuit driving portion 50, signal-processed, and input to the piezo-electric ceramic element 27. Then, the piezo-electric ceramic element 27 generates a correction force corresponding to the amount of displacement, to restore the suspension 24 to a normal position. Thus, the magnetic head h can be maintained at a constant flying height.

However, since the piezo-electric polymer element 26 is attached to the upper or lower surface of the suspension 24, it can detect only an upward or downward vibration displacement of the magnetic head h. Accordingly, since a displacement due to an impact or vibration in a lateral direction cannot be detected, in the case of a high density disk whose track pitch is very fine, the magnetic head h is displaced to an adjacent track even by a minute impact or vibration, which causes a malfunction. Also, the piezo-electric polymer element 26 is greatly influenced by the surrounding temperature, so that the reliability of displacement correction is degraded. Furthermore, a lead wire which is connected to the piezo-electric polymer element to provide starting power may be disconnected depending on the rotation of the suspension 24.

SUMMARY OF THE INVENTION

To solve the above problems, it is an object of the present invention to provide a method for controlling the flying of a magnetic head wherein the flying height of the magnetic head with respect to a disk can be actively controlled in real time by simultaneously detecting vertical and horizontal displacements of flying of the magnetic head which are generated due to a minute impact or vibration, and a device therefor, in a hard disk driver.

To accomplish the above object, there is provided a magnetic head flying controlling device in a hard disk drive comprising: a swing arm which is pivoted by a voice coil motor; a suspension combined with the swing arm for supporting a magnetic head; a first sensor installed on the body of the suspension, for detecting a vertical displacement of the suspension as a signal; a second sensor installed on the body of the suspension, for detecting a horizontal displacement of the suspension as a signal; a control circuit portion for halting the recording or reproduction of the magnetic head based on signals output from the first and second sensors while at the same time storing the halted position of the magnetic head, and generating a control signal for controlling the operation of the magnetic head; and a magnetic head flying actuator for controlling the driving of the magnetic head based on the control signal.

The first sensor is a vibration detecting sensor which is installed on both surfaces of the suspension and has an insulating layer, a first conductive layer, a piezo-electric layer, and a second conductive layer, which are sequentially stacked on the surface of the suspension. The second sensor comprises: an inertial body installed on the suspension; and a pair of thin piezo-electric pieces symmetrically supported on both surfaces of the inertial body.

The control circuit portion comprises: first and second amplifiers for amplifying and outputting signals detected by the first and second sensors, respectively; first and second comparators for comparing signals output by the first and second amplifiers to an information signal about a predetermined normal position of the suspension, and outputting an information signal according to the result of the comparison; a latch portion for outputting a signal for cutting off power to halt the recording/reproducing operation of the magnetic head depending on signals output by the first and second comparators while at the same time storing the position of the halted magnetic head; and a controller for processing a signal input thereto by the latch portion and controlling the driving of the magnetic head flying actuator.

Also, it is preferable that the magnetic head flying actuator is a thin-film piezo-electric element installed on the gimbal.

According to another aspect of the present invention, there is provided a method for controlling the flying of a magnetic head in a hard disk drive, comprising the steps of: detecting a vertical displacement of a suspension for supporting a magnetic head, as a signal, using a first sensor installed on the body of the suspension; detecting a horizontal displacement of the suspension as a signal, using a second sensor installed on the body of the suspension; halting a recording/reproducing operation of the magnetic head based on signals output by the first and second sensors; storing the halted position of the magnetic head; rapidly raising the magnetic head; and resuming the recording/reproduction operation from the halted position by restoring the magnetic head to a normal flying position, after sources of the displacement of the suspension are removed.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
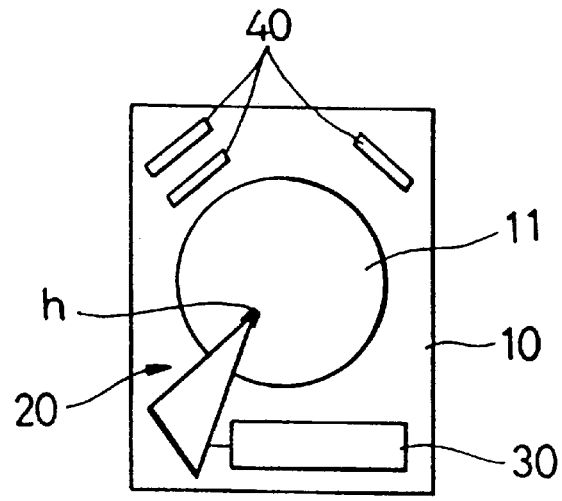
FIG. 1 is a schematic plan view of a conventional hard disk drive.
Figure 3:
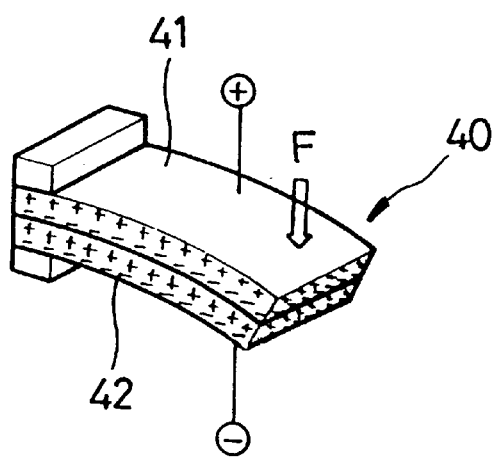
FIG. 3 is a perspective view of the vibration detecting sensor shown in FIG. 1.
Figure 2:
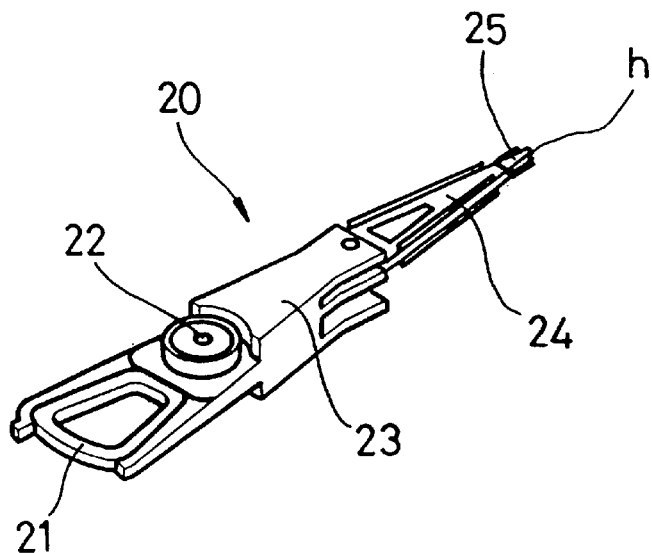
FIGS. 2 and 4 are a perspective view and a side view of the magnetic head actuator shown in FIG. 1, respectively.
Figure 4:
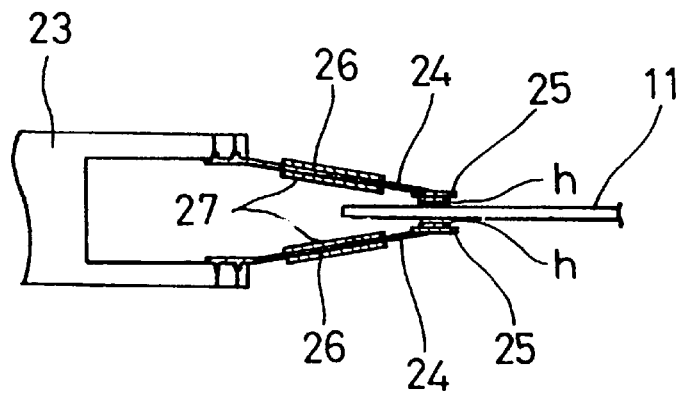
Figure 5:
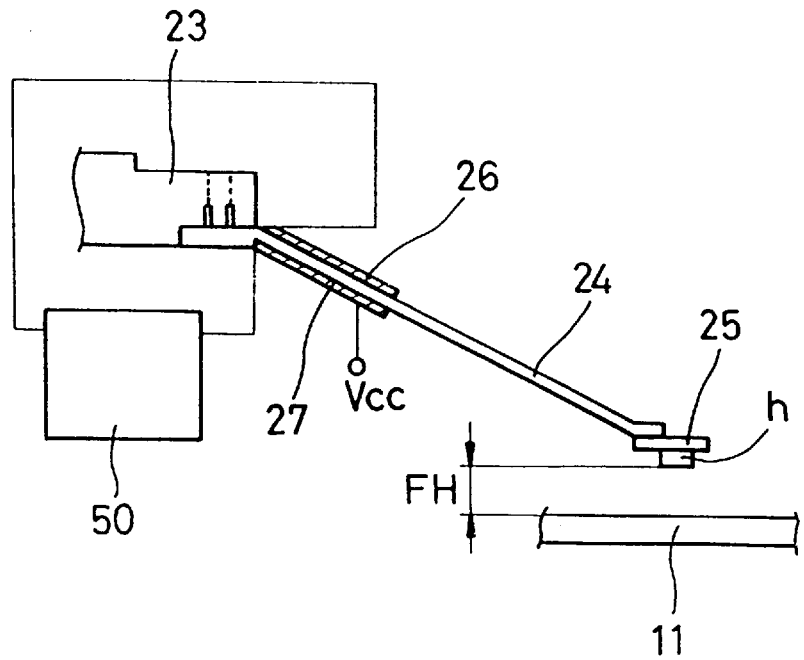
FIG. 5 is a magnified side view of the essential parts of FIG. 4.
Figure 6:
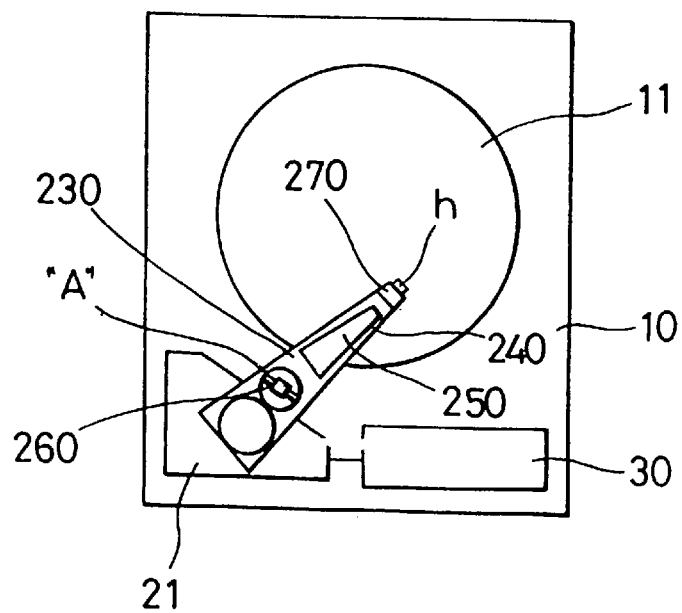
FIG. 6 is a schematic plan view of a hard disk drive adopting a magnetic head flying controlling device according to the present invention.

Referring to FIG. 6, a magnetic head flying controlling device according to the present invention includes a swing arm 230 which pivots by a voice coil motor 21, a magnetic head h which flies at a predetermined height above a disk 11 while being supported by a suspension 240 installed on the swing arm 230 in order to record or reproduce information on the disk 11, and a controlling unit for detecting the displacement of the suspension 240 and controlling the flying position of the magnetic head h. Like reference numerals to those shown in the previous drawings denote the same components.

Figure 7:
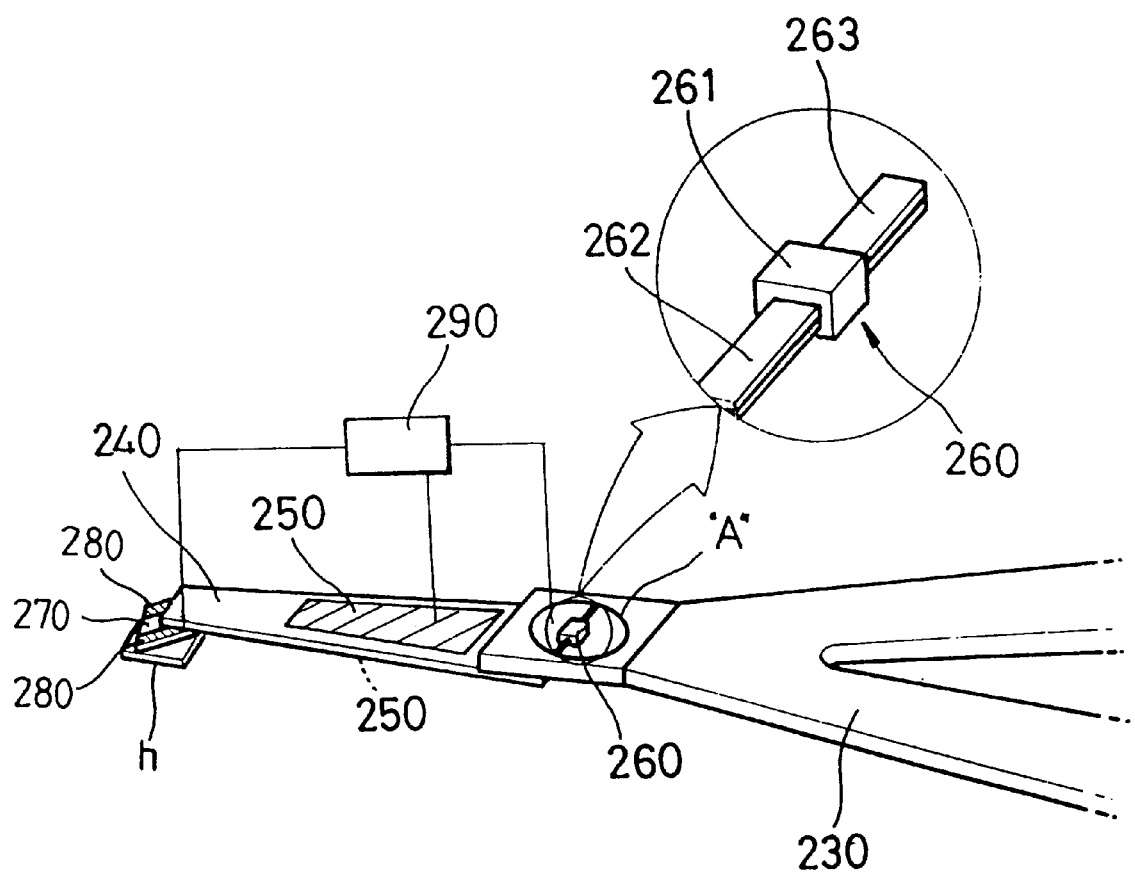
FIG. 7 is a schematic perspective view of the magnetic head actuator shown in FIG. 6.

The controlling unit, as shown in FIG. 7, includes a first sensor 250 installed on both surfaces of the suspension 240 enabling detection of a vertical displacement of the suspension 240, a second sensor 260 installed on one surface of the suspension 240 enabling detection of a horizontal displacement of the suspension 240, a control circuit portion 290 connected to the first and second sensors 250 and 260, for generating a signal for correcting the displacement of the suspension 240 based on signals output from the first and second sensors 250 and 260, and a magnetic head flying actuator 280 for receiving a correction signal from the control circuit portion 290 and controlling the flying position of a magnetic head h. The magnetic head flying actuator 280 is installed on a gimbal 270 which is connected to the leading edge of the suspension 240 and supports the magnetic head h.

Figure 8:
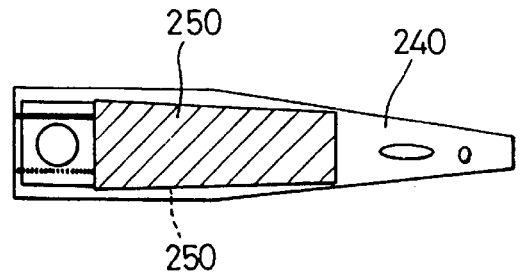
FIG. 8 is a schematic plan view of the suspension shown in FIG. 7.
Figure 9:
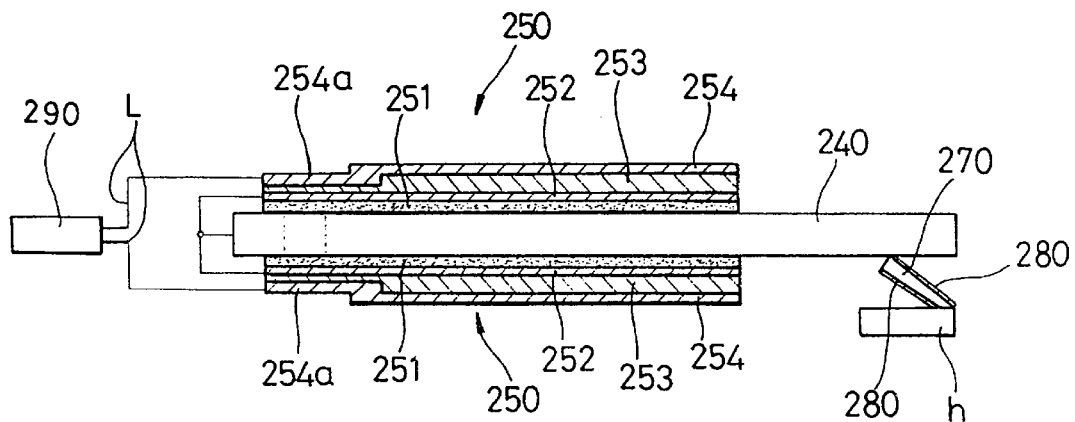
FIG. 9 is a schematic sectional view of FIG. 6.

According to the characteristics of the present invention, the first sensor 250 is a thin film piezoelectric vibration detection sensor formed by sequentially stacking an insulating layer 251, a first conductive layer 252, a piezo-electric layer 253 and a second conductive layer 254 on the surface of the suspension 240, as shown in FIGS. 8 and 9.

It is preferable that the thin film layers 251, 252, 253 and 254 are formed in a rectangular or trapezoidal shape using a sputtering method. In particular, the upper and lower piezo-electric layers 253 are formed of either a ferroelectric ceramic such as $PZT(PbZrTiO_3)$ or a polymer to have an identical polarity direction with each other. At this time, it is preferable that the layers 253 are 1 μm thick or thinner, for buoyancy is degraded to thus make accurate control difficult, if the thicknesses thereof are formed so thick that the weight of the magnetic head actuator can reach 3 g or more.

The second conductive layer 254 has an electrode layer 254a patterned to be connected to the control circuit portion 290 via a signal line L. The first conductive layer 252 is grounded to the suspension 240 by wire-bonding. According to such a grounding structure, the output of a voltage signal, which is detected by a superconductive effect depending on the influence of its surrounding temperature, is offset, so that only a signal having a pure vibration component can be detected.

Figure 10:
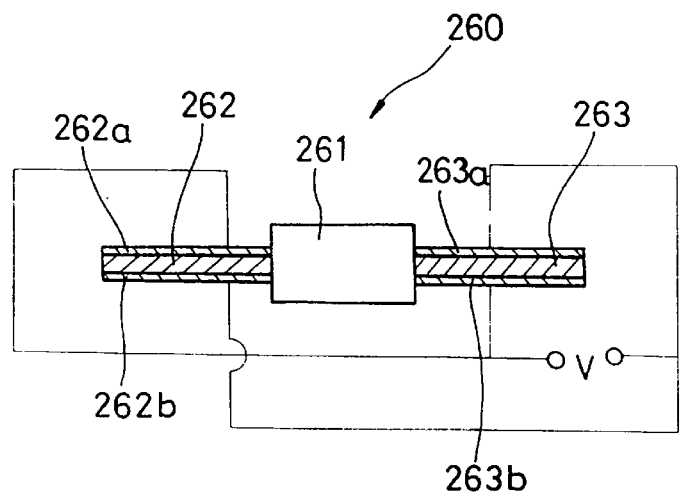
FIG. 10 is a schematic sectional view of the second sensor shown in FIG. 7.

The second sensor 260 is a vibration detecting sensor comprised of a pair of thin piezo-electric pieces 262 and 263 symmetrically supported on both sides of an inertial body 261 installed on the suspension 240, as shown in FIG. 10. The piezoelectric pieces 262 and 263 are disposed to have the same polarity direction, and have first electrode layers 262a and 263a and second electrode layers 262b and 263b formed on the upper and lower surfaces of the piezo-electric pieces 262 and 263, respectively. The first electrode layers 262a and 263a and the second electrode layers 262b and 263b are connected to detect only a pure vibration signal by offsetting the output of a voltage signal detected by the superconductive effect depending on the influence of its surrounding temperature.

Figure 11:
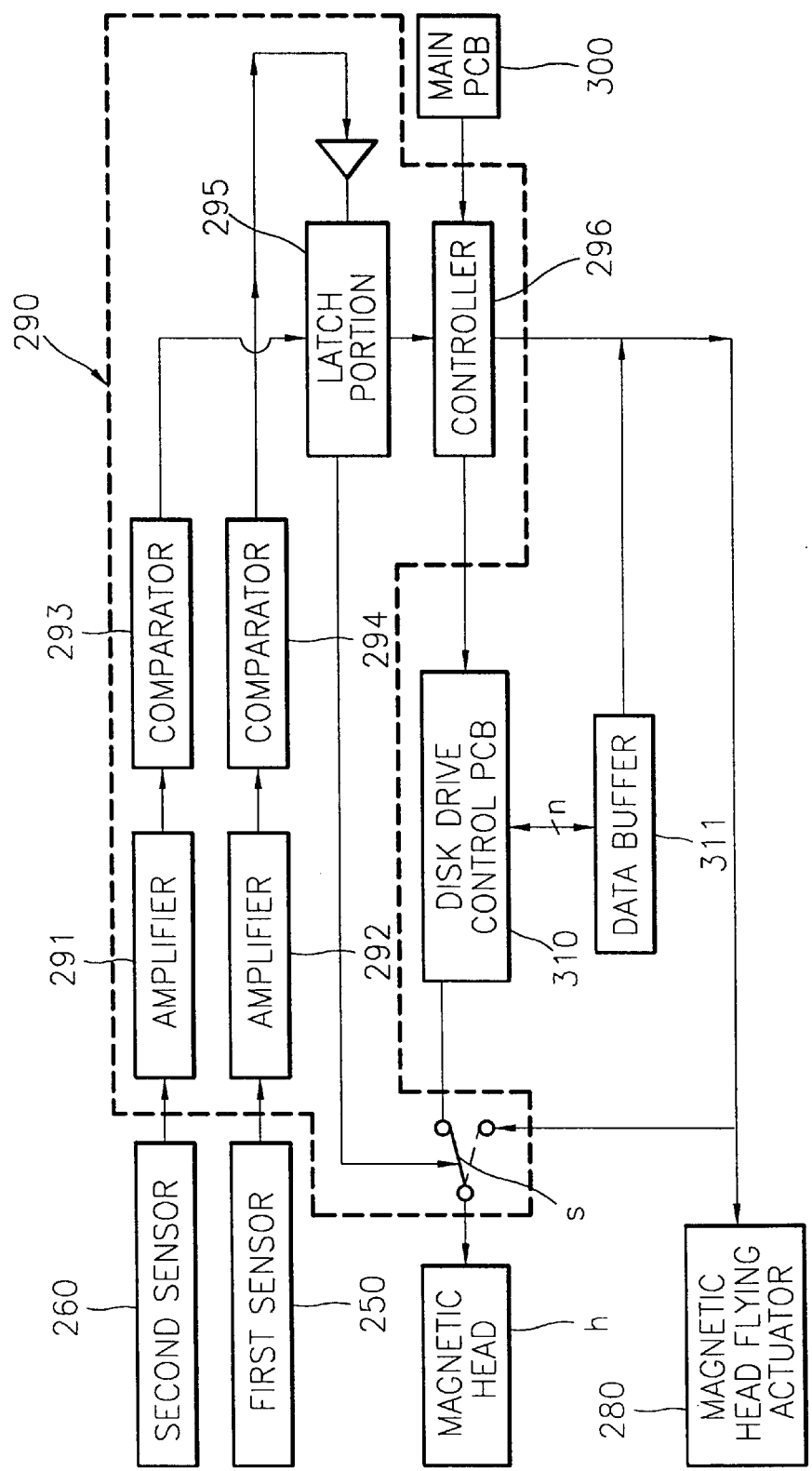
FIG. 11 is a block diagram of a control circuit portion in a magnetic head flying controlling device according to the present invention.

As shown in FIG. 11, the control circuit portion 290 includes first and second amplifiers 291 and 292 for amplifying and outputting signals detected by the first and second sensors 250 and 260, respectively, first and second comparators 293 and 294 for comparing signals output from the first and second amplifiers 291 and 292 with an information signal about a predetermined normal position of the suspension 240, a latch portion 295 for outputting a signal for halting the recording/reproducing operation of the magnetic head h by selectively cutting off power according to the signal output from the first and second comparators 293 and 294, and simultaneously storing the position of the magnetic head h, and a controller 296 for processing the signal input from the latch portion 295 and controlling the driving of the magnetic head flying actuator 280.

Reference numeral 310 in FIG. 11 is disk drive control PCB for controlling the recording or reproduction of the magnetic head h, which is switched and disconnected from the magnetic head h upon generation of abnormal vibrations. Reference numeral 311 is a data buffer installed between the disk drive control PCB 310 and, for example, a main circuit board 300 of a computer.

The actuator 280, which is a thin piezo-electric element provided on the gimbal 270 for supporting the magnetic head h, is driven to rapidly raise the magnetic head h using a control signal of the controller 296 when an abnormal vibration is generated.

Figure 12:
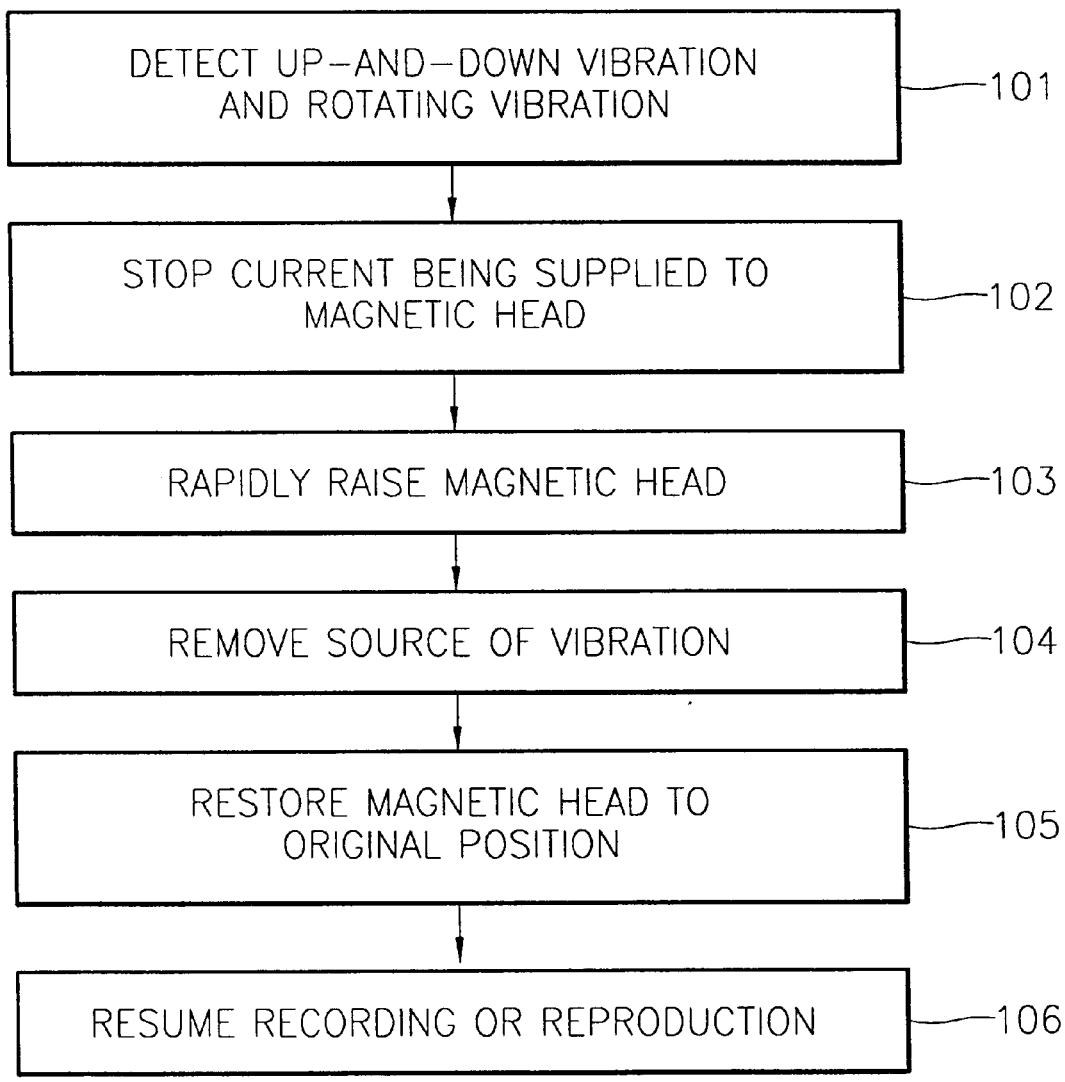
FIG. 12 is a flowchart for illustrating a method for controlling the flying of a magnetic head according to the present invention.

FIG. 12 is a flowchart for illustrating a driving control algorithm of a magnetic head flying controlling device according to the present invention. The magnetic head flying controlling method for a hard disk drive, and the operation of the device therefor, will now be described in detail referring to FIGS. 7 through 12.

When the driving of the hard disk drive is begun, the magnetic head h is in contact with the disk 11. As the rotation speed of the disk 11 increases, the magnetic head h is raised to a certain height above the disk 11 and records or reproduces information while flying over the disk 11. At this time, when an impact or vibration is transmitted from an external source, the first sensor 250 detects a horizontal displacement of the suspension 240, in step 101. That is, the balance of electrical charges evenly distributed inside or outside is broken by the upper and lower piezo-electric pieces 253 being bent by the impact. A voltage output due to this event is input to the control circuit portion 290. Simultaneously, the second sensor 260 can detect a horizontal displacement of the suspension 240. That is, when the piezo-electric pieces 262 and 263 are deformed by an impact, the balance of electrical charges evenly distributed inside and outside is broken, and a voltage output is input to the control circuit portion 290.

Horizontal and vertical vibration signals, respectively detected by the first and second sensors 250 and 260, are amplified by the first and second amplifiers 291 and 292, and compared to an information signal about a predetermined normal position of the suspension 240 by the first and second comparators 293 and 294. Then, an information signal according to the result of the above comparison is output to the latch portion 295.

The latch portion 295 transmits a signal to a switch S and the controller 296 when signals output from the first and second comparators 293 and 294 are signals of displacement generated due to an abnormal vibration, turns off the power to the magnetic head h, and stores the halted position of the magnetic head h while at the same time halting the recording or reproduction, in step 102.

The controller 296 processes a signal input from the latch portion 295 and drives the magnetic head flying actuator 280, whereby the magnetic head h is rapidly raised in step 103. At this time, the disk 11 rotates at normal speed.

Next, when the cause of an impact or vibration is removed in step 104, a normal signal is output by the control circuit portion 290. Thus, in step 105, the controller 296 drives the magnetic head flying actuator 280 to restore the magnetic head h to a normal flying position. At this time, the latch portion 295 transmits a signal for switching on the power of the magnetic head h to the switch S, and a normal recording/reproducing operation is resumed by transmitting information on the stored halted position of the magnetic head h to the disk drive control PCB 310 via the controller 296, in step 106.

As described above, according to the method for controlling the flying of a magnetic head for a hard disk drive according to the present invention and the device therefor, horizontal and vertical flying displacements of the magnetic head caused by a minute impact or vibration are simultaneously detected and thus can be corrected in real time. Therefore, particularly for high density disks whose track pitch is significantly fine, its recording/reproducing operation can be performed more stably and reliably. Also, abrasion and damage due to impact contact upon the early raising or the landing of the magnetic head can be prevented.

It is contemplated that numerous modifications may be made to the apparatus and procedure of the invention without departing from the spirit and scope of the invention as defined in the following claims.

What is claimed is:

1. A magnetic head flying controlling device in a hard disk drive comprising:

a swing arm which is pivoted by a voice coil motor;

a suspension combined with said swing arm for supporting a magnetic head;

a first sensor installed on the body of said suspension, for detecting a vertical displacement of said suspension as a signal;

a second sensor installed on the body of said suspension, for detecting a horizontal displacement of said suspension as a signal;

a control circuit portion for halting in a halted position at least one of the recording and reproduction of said magnetic head based on signals output from said first and second sensors while simultaneously storing the halted position of said magnetic head, and generating a control signal for controlling operation of said magnetic head; and a magnetic head flying actuator for controlling driving of said magnetic head based on said control signal;

wherein said suspension comprises an upper and a lower surface, and wherein said first sensor is a vibration detecting sensor which is installed on both said upper and lower surfaces of said suspension, and said vibration detecting sensor comprises:

an insulating layer, a first conductive layer, a piezo-electric layer, and a second conductive layer, which are sequentially stacked on the surface of said suspension.

2. The magnetic head flying controlling device in a hard disk drive as claimed in claim 1, wherein said piezo-electric layer is formed to a thickness between 0.6 µm and 1 µm.

3. The magnetic head flying controlling device in a hard disk drive as claimed in claim 1, wherein said piezo-electric layer is formed of at least one of PZT and a polymer.

4. The magnetic head flying controlling device in a hard disk drive as claimed in claim 1, wherein said second conductive layer includes an electrode layer patterned to be connected to said control circuit.

5. The magnetic head flying controlling device in a hard disk drive as claimed in claim 1, wherein said first conductive layer is grounded to said suspension by wire bonding.

6. The magnetic head flying controlling device in a hard disk drive as claimed in claim 1, wherein said second sensor comprises:

an inertial body installed on said suspension; and a pair of thin piezo-electric pieces symmetrically supported on both said upper and lower surfaces of said inertial body.

7. The magnetic head flying controlling device in a hard disk drive as claimed in claim 6, wherein said pair of thin piezo-electric pieces are disposed to have the same polarity direction.

8. The magnetic head flying controlling device in a hard disk drive as claimed in claim 6, wherein first and second electrode layers are formed both said upper and lower surfaces of said pair of thin piezo-electric pieces, respectively, and said first and second electrode layers are connected to each other.

9. The magnetic head flying controlling device in a hard disk drive as claimed in claim 1, wherein said control circuit portion comprises:

first and second amplifiers for amplifying and outputting signals detected by said first and second sensors, respectively;

first and second comparators for comparing signals output by said first and second amplifiers to an information signal about a predetermined normal position of said suspension, and outputting an information signal according to a result of the comparison;

a latch portion for outputting a signal for cutting off power to halt the recording/reproducing operation of said magnetic head depending on signals output by said first and second comparators while at the same time storing the position of said halted magnetic head; and a controller for processing a signal input thereto by said latch portion and controlling the driving of said magnetic head flying actuator.

10. The magnetic head flying controlling device in a hard disk drive as claimed in claim 1, wherein said magnetic head flying actuator is a thin-film piezo-electric element installed on said gimbal.

11. A method for controlling the flying of a magnetic head in a hard disk drive, said method comprising the steps of:

detecting a vertical displacement of a suspension for supporting a magnetic head, as a signal, using a first vibration detecting sensor installed on both upper and lower surfaces of said suspension, said vibration detecting sensor including an insulating layer, a first conductive layer, a piezo-electric layer, and a second conductive layer, which are sequentially stacked on the suspension;

detecting a horizontal displacement of said suspension as a signal using a second sensor installed on the body of said suspension;

halting a recording/reproducing operation of said magnetic head based on signals output by said first and second sensors, in a halted position;

storing the halted position of said magnetic head;

raising said magnetic head; and resuming the recording/reproduction operation from said halted position by restoring said magnetic head to a normal flying position, after sources of the vertical and horizontal displacements of said suspension are removed.

* * * * *